(12) United States Patent
Petroelje et al.

(10) Patent No.: US 11,048,138 B2
(45) Date of Patent: Jun. 29, 2021

(54) NANOPARTICLE RESISTIVE FILMS FOR ELECTROCHROMIC DEVICES, AND METHODS OF MAKING THE SAME

(71) Applicant: Gentex Corporation, Zeeland, MI (US)

(72) Inventors: Zachary J. Petroelje, Hudsonville, MI (US); William L. Tonar, Holland, MI (US); Leroy J. Kloeppner, Jenison, MI (US)

(73) Assignee: GENTEX CORPORATION, Zeeland, MI (US)

( * ) Notice: Subject to any disclaimer, the term of this patent is extended or adjusted under 35 U.S.C. 154(b) by 147 days.

(21) Appl. No.: 16/281,425

(22) Filed: Feb. 21, 2019

(65) Prior Publication Data
US 2019/0258129 A1 Aug. 22, 2019

Related U.S. Application Data

(60) Provisional application No. 62/633,947, filed on Feb. 22, 2018.

(51) Int. Cl.
*G02F 1/153* (2006.01)
*G02F 1/161* (2006.01)
*G02F 1/155* (2006.01)

(52) U.S. Cl.
CPC ............ *G02F 1/1533* (2013.01); *G02F 1/155* (2013.01); *G02F 1/161* (2013.01); *G02F 2202/36* (2013.01)

(58) Field of Classification Search
CPC ........ G02F 1/1533; G02F 1/155; G02F 1/161; G02F 2202/36
USPC .................................................. 359/265–275
See application file for complete search history.

(56) References Cited

U.S. PATENT DOCUMENTS

| | | | |
|---|---|---|---|
| 4,832,463 A | 5/1989 | Goldner et al. |
| 4,865,428 A | 9/1989 | Corrigan |
| 4,876,628 A | 10/1989 | Goldner et al. |
| 4,902,108 A | 2/1990 | Byker |
| 4,904,620 A | 2/1990 | Schmitz |
| 4,917,477 A | 4/1990 | Bechtel et al. |
| 5,133,594 A | 7/1992 | Haas et al. |
| 5,171,413 A | 12/1992 | Arntz et al. |
| 5,818,625 A | 10/1998 | Forgette et al. |
| 5,888,431 A | 3/1999 | Tonar et al. |
| 5,940,201 A | 8/1999 | Ash et al. |
| 6,045,643 A | 4/2000 | Byker et al. |
| 6,057,956 A | 5/2000 | Ash et al. |

(Continued)

FOREIGN PATENT DOCUMENTS

| | | |
|---|---|---|
| EP | 2947508 A1 | 11/2015 |
| WO | 2012177790 A2 | 12/2012 |

OTHER PUBLICATIONS

Wei Zhou, Amare Benor Belay, Kris Davis, and Nicoleta Sorloaica-Hickman, Transparent Conductive Film Fabrication by Carbon Nanotube Ink Spray Coating and Ink-Jet Printing, Published in 2012 38th IEEE Photovoltaic Specialists Conference, pp. 002324-002327.

*Primary Examiner* — William Choi
(74) *Attorney, Agent, or Firm* — Price Heneveld LLP; Bradley D. Johnson

(57) ABSTRACT

An electrochromic device and an electrode assembly for forming an electrochromic device includes a substrate, a conductive layer disposed over the substrate, and a resistive layer disposed over the conductive layer. The resistive layer includes conductive particles disposed in a polymer binder. The conductive particles include at least one doped metal oxide.

20 Claims, 6 Drawing Sheets

(56) References Cited

U.S. PATENT DOCUMENTS

| | | |
|---|---|---|
| 6,115,171 A | 9/2000 | Minami et al. |
| 6,137,620 A | 10/2000 | Guarr et al. |
| 6,222,177 B1 | 4/2001 | Bechtel et al. |
| 6,249,369 B1 | 6/2001 | Theiste et al. |
| 6,268,950 B1 | 7/2001 | Ash et al. |
| 6,597,489 B1 | 7/2003 | Guarr et al. |
| 6,635,194 B2 | 10/2003 | Kloeppner et al. |
| 6,700,692 B2 | 3/2004 | Tonar et al. |
| 7,317,566 B2 | 1/2008 | Tench et al. |
| 7,372,611 B2 | 5/2008 | Tonar et al. |
| 7,688,495 B2 | 3/2010 | Tonar et al. |
| 7,746,534 B2 | 6/2010 | Tonar et al. |
| 7,830,583 B2 | 11/2010 | Neuman et al. |
| 8,169,681 B2 | 5/2012 | Tonar et al. |
| 8,274,729 B2 | 9/2012 | Luten et al. |
| 8,284,471 B2 | 10/2012 | Yeh et al. |
| 8,368,992 B2 | 2/2013 | Neuman et al. |
| 8,506,096 B2 | 8/2013 | McCabe et al. |
| 8,547,622 B2 | 10/2013 | Tonar et al. |
| 8,727,547 B2 | 5/2014 | McCabe et al. |
| 8,873,127 B2 | 10/2014 | Neuman et al. |
| 8,928,966 B1 | 1/2015 | Kloeppner et al. |
| 9,020,211 B2 | 4/2015 | Momoi |
| 9,056,584 B2 | 6/2015 | Fish, Jr. et al. |
| 9,091,868 B2 | 7/2015 | Bergh et al. |
| 9,341,912 B2 | 5/2016 | Shrivastava et al. |
| 9,529,214 B2 | 12/2016 | Neuman et al. |
| 9,544,999 B2 | 1/2017 | Shin et al. |
| 9,606,410 B2 | 3/2017 | Bergh et al. |
| 9,658,508 B1 | 5/2017 | Bass et al. |
| 9,701,248 B2 | 7/2017 | Neuman et al. |
| 9,766,528 B2 | 9/2017 | Kloeppner et al. |
| 9,939,071 B2 | 4/2018 | Lin et al. |
| 10,017,847 B2 | 7/2018 | Luten et al. |
| 10,191,348 B2 | 1/2019 | Luten et al. |
| 2002/0015214 A1 | 2/2002 | Nishikitani et al. |
| 2008/0151350 A1 | 6/2008 | Tonar et al. |
| 2012/0069420 A1 | 3/2012 | Suzuki |
| 2013/0278989 A1 | 10/2013 | Lam et al. |
| 2014/0043669 A1 | 2/2014 | Bergh et al. |
| 2016/0377946 A1 | 12/2016 | Baumann |
| 2017/0146880 A1 | 5/2017 | Baumann et al. |
| 2017/0299934 A1 | 10/2017 | Brossard |
| 2017/0336692 A1 | 11/2017 | Park et al. |
| 2017/0336693 A1 | 11/2017 | Stephenson et al. |

US 11,048,138 B2

NANOPARTICLE RESISTIVE FILMS FOR ELECTROCHROMIC DEVICES, AND METHODS OF MAKING THE SAME

CROSS-REFERENCE TO RELATED APPLICATION

This application claims priority to and the benefit under 37 U.S.C. § 119(e) of U.S. Provisional Application No. 62/633,947, filed on Feb. 22, 2018, entitled "ITO NANOPARTICLE/POLYVINYL ALCOHOL PASSIVATING FILMS FOR EC," the disclosure of which is incorporated herein by reference in its entirety.

TECHNOLOGICAL FIELD

The present technology is generally related to the field of electrochromic devices, and more particularly, relates to electrode assemblies for forming electrochromic devices that include resistive films applied to conductive layers.

BACKGROUND

The present technology relates generally to the field of electrochromic devices. The variability in color and light transmittance of electrochromic materials with applied voltage has allowed the production of mirrors with variable reflectance and windows with variable light transmission. It is desirable in electrochromic devices to maintain a uniform appearance, such as a substantially uniform color, light transmittance, or reflectance across the device. Variations in the voltage applied to the electrochromic material in an electrochromic device can lead to variations in the response of the electrochromic material and its corresponding physical appearance in the electrochromic device.

The susceptibility of electrochromic devices to undesirable voltage variations may be a function of the current load of the electrochromic material. For example, a current load of the electrochromic material may increase as the area of the electrochromic device increases, the cell spacing of the electrochromic device decreases, or the concentration of the electrochromic dyes increases. An increased current load of the electrochromic device may produce an undesired voltage drop across the electrochromic device. This voltage drop can produce a non-uniform response of the electrochromic material leading to a non-uniform appearance of the electrochromic device. Various efforts have attempted to reduce the voltage drop across an electrochromic device by increasing the conductivity of the electrodes providing the voltage to the electrochromic material. However, as the current load of the electrochromic materials continues to increase, the conductivity of the electrodes cannot be increased sufficiently to fully prevent undesired voltage variations.

SUMMARY

Aspects provided herein relate generally to electrochromic devices. More specifically, the aspects relate to an electrochromic device and electrodes for an electrochromic device that include a resistive film or coating that includes conductive particles disposed in a polymer binder.

According to an aspect of the present disclosure, an electrochromic device includes a first substrate, a first conductive layer disposed over the first substrate, a second substrate, and a second conductive layer disposed over the second substrate. An electrochromic material can be disposed between the first and second conductive layers. At least one resistive layer is disposed over at least one of the first conductive layer and the second conductive layer. The at least one resistive layer includes conductive particles disposed in a polymer binder, wherein the conductive particles include at least one doped metal oxide.

According to an aspect of the present disclosure, an electrode assembly for an electrochromic device includes a substrate, a conductive layer disposed over the substrate, and a resistive layer disposed over the conductive layer. The resistive layer includes conductive particles disposed in a polymer binder, wherein the conductive particles include at least one doped metal oxide.

According to another aspect of the present disclosure, a method of forming an electrode assembly for an electrochromic device is provided. The method includes disposing a conductive layer over a substrate and disposing a resistive layer over the conductive layer. The at least one resistive layer includes conductive particles disposed in a polymer binder, wherein the conductive particles include at least one doped metal oxide.

These and other features, advantages, and objects of the present device will be further understood and appreciated by those skilled in the art upon studying the following specification, claims, and appended drawings.

DETAILED DESCRIPTION

Figure 1:
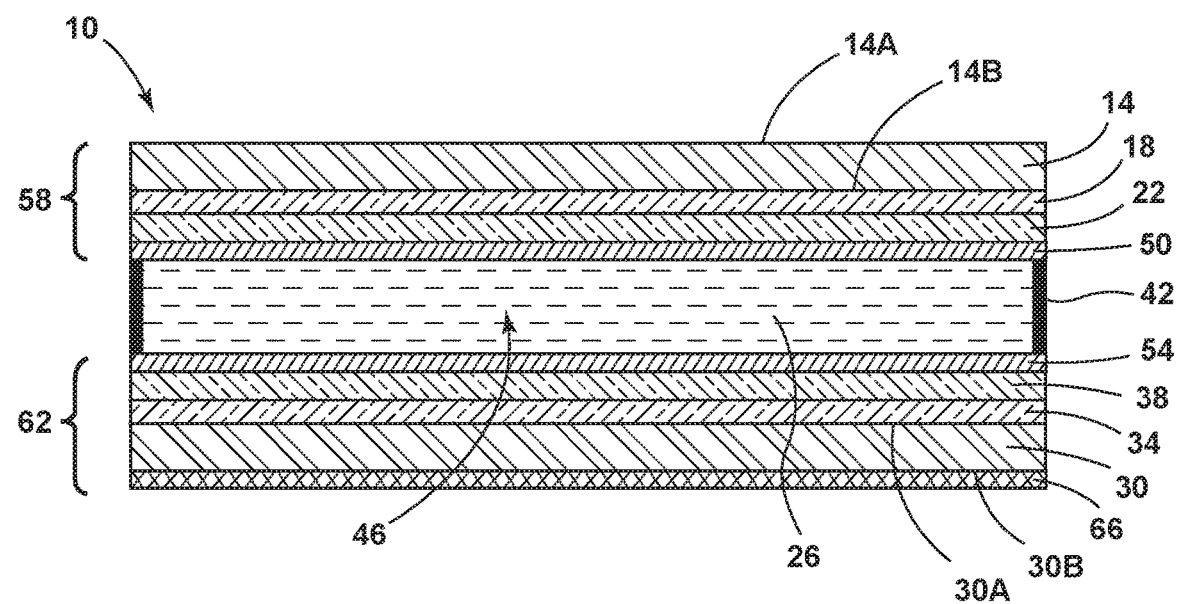
FIG. 1 is a cross-sectional view of an electrochromic device, according to some aspects of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

Various aspects are described hereinafter. It should be noted that the specific aspects are not intended as an exhaustive description or as a limitation to the broader aspects discussed herein. One aspect described in conjunction with a particular aspect is not necessarily limited to that aspect and can be practiced with any other aspect(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be constructed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the aspects and does not pose a limitation on the scope of the claims unless otherwise stated. No language in the specification should be construed as indicating any non-claimed element as essential.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "substantially transparent" as used herein will be understood by persons of ordinary skill in the art and will vary to some extent depending upon the context in which it is used. If there are uses of the term which are not clear to persons of ordinary skill in the art, given the context in which it is used, the term means that the material allows a light transmission of about 75% or more of a beam of light having a wavelength of 400 nm directed to the material at a specular angle of 10° through a thickness of 2 mm of the material.

Electrochromic devices with high current loads may experience a non-uniform appearance during operation due to undesired voltage variations existing across the device. For example, a high current load electrochromic device with an edge bus arrangement may experience a voltage drop across the area of the device where the voltage drop increases as function of distance from the edge bus. This type of voltage drop can result in an electrochromic device that is unable to maintain a uniform coloration across the device when activated, which is undesirable. The inability of an electrochromic device to darken or color evenly from the edge to the center of the device may be referred to as an "irising effect."

A voltage drop across an electrochromic device may be remedied by increasing the current available to the electrochromic material. However, the response of the electrochromic material may be self-limiting in terms of the amount of voltage that may be applied thereto. For this reason, previous efforts to increase the current available to the electrochromic material have attempted to increase the conductivity of the electrode materials that supply the voltage to the electrochromic material. This approach allows the current available to the electrochromic material to be increased without increasing the drive voltage supplied to the electrodes. Efforts to increase the conductivity of the electrodes have approached the limits of what is technically feasible with transparent electrode materials. Thus, other approaches to increasing the current available to the electrochromic material are desirable.

By disposing one or more resistive film or coating layers between the electrodes that supply the voltage to the electrochromic material, the drive voltage supplied to the electrodes may be increased without increasing the voltage applied to the electrochromic material. This approach effectively increases the current available to satisfy the current load requirements of the electrochromic material while maintaining the voltage supplied to the electrochromic material in acceptable ranges. This solution is simple and cost effective, as current electrochromic materials designed for operation at low voltage may be employed. Additionally, the increased current delivery capacity of a system including such an arrangement allows for the production of electrochromic devices with increased area, decreased cell spacing, and increased electrochromic dye concentration.

Referring now to FIGS. 1-5, an electrochromic device 10 is provided. The electrochromic device 10 includes a first substrate 14; a first conductive layer 18 disposed over the first substrate 14; a first resistive layer 22 disposed over the first conductive layer 18 wherein the first resistive layer 22 comprises conductive particles disposed in a polymer binder; an electrochromic material in the form of an electrochromic layer 26; a second substrate 30; a second conductive layer 34 disposed over the second substrate 30; and a second resistive layer 38 disposed over the second conductive layer 34. The second resistive layer 38 comprises conductive particles disposed in the polymer binder. The first resistive layer 22 is disposed between the first conductive layer 18 and the electrochromic layer 26, and the second resistive layer 38 is disposed between the second conductive layer 34 and the electrochromic layer 26.

Referring to FIG. 1, a cross-section of an electrochromic device 10 is provided. The electrochromic device 10 includes first substrate 14 having a first surface 14A and a second surface 14B, and the second substrate 30 having a third surface 30A and a fourth surface 30B. The second surface 14B and the third surface 30A have associated therewith the first conductive layer 18 and the second conductive layer 34, respectively. The first substrate 14 and the second substrate 30, along with a sealing member or seal 42 define a chamber 46 for containing the electrochromic layer 26. The device 10 also includes one or more plugs (not shown) associated with one or more fill ports (not shown) that may be disposed within the first substrate 14, the second substrate 30, or the sealing member 42. The first resistive layer 22 is disposed between the first conductive layer 18 and the electrochromic layer 26, and the second resistive layer 38 is disposed between the second conductive layer 34 and the electrochromic layer 26. Upon mounting as a mirror, window, filter, or other device, the electrochromic device 10 may optionally include a bezel (not shown) that extends around a periphery of at least one of the first substrate 14 and the second substrate 30 to conceal and/or protect a bus connector (if present), the sealing member 42, the one or more plugs, or the one or more fill ports.

Still referring to FIG. 1, a voltage source (not shown) is electrically connected to the first conductive layer 18 and the second conductive layer 34 in a manner that applies a voltage across the electrochromic layer 26. The application of a voltage across the electrochromic layer 26 changes the coloration and transmissivity of the electrochromic layer 26, thereby changing the appearance of the electrochromic device 10.

In some aspects, a first additional conductive layer 50 or a first flash layer 50 may optionally be disposed between the first resistive layer 22 and the electrochromic layer 26. Similarly, in some aspects a second additional conductive layer 54 or a second flash layer 54 may optionally be disposed between the second resistive layer 38 and the electrochromic layer 26. The additional conductive or flash layers 50, 54 serve to control for any variability across the resistive layers 22, 38 by dissipating any voltage irregularities that result from variability in the resistive layers 22, 38 over short length scales. The additional conductive layers 50, 54 are not directly electrically connected to the conductive layers 18, 34. The first substrate 14, first conductive layer 18, first resistive layer 22, and first additional conductive layer 50 may be provided as a first panel 58 or first electrode 58. The second substrate 30, second conductive layer 34, first resistive layer 38, and second additional conductive layer 54 may be provided as a second panel 62 or second electrode 62. The first panel 58 and the second panel 62 may be joined by seals 42 to produce a cell in which the electrochromic layer 26 is contained.

In some aspects the electrochromic device 10 may be a mirror that includes a reflective layer 66 disposed over the fourth surface 30B of the second substrate 30. The reflective layer 66 may be disposed on the fourth surface 30B of the second substrate 30 opposite the third surface 30A of the second substrate 30 over which the second conductive layer 34 is disposed. Alternatively, the second conductive layer 34 or the second additional conductive layer 54 may be reflective.

In some aspects the electrochromic device 10 may be a window that does not include the reflective layer 66. In the case that the electrochromic device 10 is a window, the first substrate 14, the first conductive layer 18, the first resistive layer 22, the first additional conductive layer 50, the second substrate 30, the second conductive layer 34, the second resistive layer 38, and the second additional conductive layer 54 are transparent or substantially transparent. As utilized herein "transparent" may refer to transparency to visible light and, optionally, near-IR light. Additionally, when the electrochromic device 10 is a window, the electrochromic layer 26 is transparent or substantially transparent when the electrochromic device 10 is in the non-activated state. As utilized herein the "activated state" of the electrochromic device 10 is the state in which a voltage is applied to the electrochromic layer 26.

Several other electrochromic device configurations are contemplated for use, including, but not limited to, those disclosed in U.S. Pat. Nos. 5,818,625; 6,597,489; and 6,700,692, which are incorporated herein by reference in their entirety.

In some aspects, the first substrate 14 may be fabricated from any one of a number of materials that are transparent or substantially transparent in the visible and/or near-infrared (NIR) regions of the electromagnetic spectrum, such as, for example, borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, cyclic olefin polymers (COP), and cyclic olefin copolymers (COC), examples of which are available from TOPAS® Advanced Polymers. In one aspect, the first substrate 14 is fabricated from a sheet of glass or plastic having a thickness ranging from about 0.10 millimeters (mm) to about 12.7 mm. This may include any range of thickness, such as from about 0.50 mm to about 1.50 mm, or from about 0.65 mm to about 1.00 mm. Of course, the thickness of the first substrate 14 will depend upon the particular application of the electrochromic device 10. While particular substrate materials have been disclosed for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices 10 in accordance with the present disclosure can be, during normal operation, exposed to extreme temperature variation as well as substantial UV radiation, emanating primarily from the sun. It will be further understood that first substrate 14 and/or second substrate 30 may include a UV absorbing layer and/or contain a UV absorbing material (not shown) to help protect the substrate(s) and/or the electrochromic media from UV damage.

In some aspects, the second substrate 30 may be fabricated from similar materials as that of the first substrate 14, or where transparency of the second substrate 30 is not desired, the second substrate 30 may be a metal. The second substrate 30 is fabricated from a sheet of glass or plastic having a thickness ranging from about 0.10 mm to about 12.7 mm. This may include thicknesses from about 0.50 mm to about 1.50 mm, or from about 0.65 mm to about 1.00 mm. If the first and second substrates 14, 30 are fabricated from sheets of glass, then the glass can optionally be tempered, heat strengthened, chemically strengthened, and/or laminated prior to, or subsequent to, being coated with layers of electrically conductive material.

The first conductive layer 18, the first additional conductive layer 50, the second conductive layer 34, and the second additional conductive layer 54, collectively referred to herein as the conductive layers, may be any appropriate electrically conductive material, such as an electrically conductive material that is transparent or substantially transparent. Such conductive layers include, but are not limited to, those described in U.S. Pat. No. 9,766,528, issued Sep. 19, 2017, which is incorporated herein by reference in its entirety.

One or more layers of an electrically conductive material may be used to form the conductive layers that may be associated with the second and third surfaces 14B, 30A of the first and second substrates 14, 30. These respective layers, (substrate 14, 30; conductive layers 18, 34; and resistive layers 22, 38) serve as the electrode assembly 58, 62 for the electrochromic device 10. The electrically conductive material used to make the conductive layers is desirably a material that: (a) is substantially transparent in the visible and/or NIR region of the electromagnetic spectrum; (b) bonds reasonably well to the first and second substrates; (c) maintains this bond when associated with a sealing member; (d) is generally resistant to corrosion from materials contained within the electrochromic device or the atmosphere; and (e) exhibits minimal diffusion or specular reflectance, as well as sufficient electrical conductance. It is contemplated that the electrically conductive material may be fabricated from fluorine doped tin oxide (FTO), for example TEC glass, indium/tin oxide (ITO), doped zinc oxide, indium zinc oxide, metal oxide/metal/metal oxide (wherein metal oxide can be substituted with metal carbide, metal nitride, metal sulfide, etc.), or other materials known to those having ordinary skill in the art. The electrically conductive material may be operatively bonded to the electrically conductive material associated with the first substrate 14 by the sealing member 42. Once bonded, the sealing member 42, plug and/or the juxtaposed portions of conductive layers 18, 34 may serve to generally define an inner peripheral geometry of the chamber 46. Alternatively, edge sealing techniques may be utilized which are disclosed in U.S. Pat. No. 7,372,611, which is incorporated herein by reference in its entirety.

In some aspects, the first and second substrates 14, 30 may be substantially transparent and have a cell distance of less than 600 μm. In other aspects, the first substrate 14 and second substrate 30 may have a cell distance of about 150 μm to about 600 μm, about 200 μm to about 300 μm, about 225 μm to about 275 μm, or ranges between any two of these values (including endpoints). In still other embodiments, the first substrate 14 and second substrate 30 may have a cell distance of about 350 μm, 300 μm, 275 μm, 250 μm, 225 μm, 200 μm, 175 μm, 150 μm, 125 μm, 100 μm, 90 μm, 80 μm, 70 μm, 60 μm, 50 μm, 40 μm, 30 μm, 20 μm, 10 μm, or ranges between any two of these values (including endpoints). In still more aspects, the first substrate 14 and the second substrate 30 may have a cell distance of about 250 μm.

In some aspects, the sealing member 42 may include any material that is configured to adhesively bond to the conductive layers 18, 34 and/or resistive layers 22, 38 and/or second conductive layers 50, 54 coated on the first and second substrate 14, 30 to, in turn, seal the chamber 46, (in certain aspects in cooperation with a plug and fill port) so that electrochromic layer 26 does not inadvertently leak out of the chamber 46 or become exposed to the outside atmosphere. It will be understood that sealing member 42 can be fabricated from any suitable material.

The first resistive layer 22 and the second resistive layer 38 may be any appropriate resistive material, such as a resistive material that is transparent or substantially transparent. The resistive layers may have a sheet resistance of at least about 1,000 Ω/square and less than about 10,000 Ω/square, such as about 1,000 Ω/square to about 6,000 Ω/square. In some aspects the resistive layers may have a sheet resistance of about 3,000 Ω/square. In other aspects, the resistive layer has a sheet resistance from about 1,000 Ω/square to about 10,000 Ω/square. In various other aspects, the resistive layer has a sheet resistance from about 1000 Ω/square to about 6,000 Ω/square, or from about 2,000 Ω/square to about 4,000 Ω/square. The resistive layers may be selected such that the drive voltage is reduced to apply a maximum voltage above the minimum coloring potential and below the damage potential of the electrochromic material. In some aspects the resistive layers may include oxidized titanium disilicide, undoped tin oxide, ceramics, polymers, and polymer/nanoparticle composites. The resistive layers may be formed from materials that produce a sufficient bonding strength with the conductive layers, and the thickness of the resistive layers may be selected to render the resistive layers transparent or substantially transparent.

In some aspects, the resistive layers may have a resistance of at least about 0.001 S/cm and less than about 1,000 S/cm, such as about 0.01 S/cm to about 1,000 S/cm. In some aspects the resistive layers may have a resistance from about 100 S/cm to about 750 S/cm. In other aspects, the resistive layer has a resistance from about 0.1 S/cm to about 500 S/cm. In various other aspects, the resistive layer has a resistance from about 10 S/cm to about 1000 S/cm, or from about 0.01 S/cm to about 100 S/cm.

According to one aspect of the present disclosure, the first resistive layer 22 and the second resistive layer 38, collectively referred to herein as the resistive layers, include a mixture or combination of conductive particles where the oxide forming the conductive particle may include silicon oxide, aluminum oxide, zirconium oxide, titanium oxide, zinc oxide, tantalum oxide, niobium oxide, bismuth oxide, yttrium oxide, iridium oxide, indium oxide, ITO (Indium Tin Oxide), IZO (Indium Zinc Oxide), AZO (Al-doped ZnO), GZO (Ga-doped ZnO), FTO (fluorine-doped $SnO_2$), and combinations thereof. In still other aspects, the conductive particles may include ITO (Indium Tin Oxide), IZO (Indium Zinc Oxide), AZO (Al-doped ZnO), GZO (Ga-doped ZnO), FTO (fluorine-doped $SnO_2$).

According to one aspect of the present disclosure, the first resistive layer 22 and the second resistive layer 38, collectively referred to herein as the resistive layers, include conductive particles formed from at least one doped metal oxide. In one aspect, the resistive layers can include a mixture or combination of conductive particles formed from doped metal oxides. The doped metal oxides can be selected from the group including tin-doped indium oxide (ITO), aluminum-doped zinc oxide (AZO), zinc-doped indium oxide (IZO), gallium-doped zinc oxide (GZO), fluorine-doped tin oxide (FTO), antimony-doped tin oxide (ATO), phosphorus-doped tin oxide (PTO), and/or niobium-doped titanium oxide (NTO). According to one aspect, the conductive particles include transparent doped metal oxides.

According to some aspects, the conductive particles are nanoparticles having an average particle diameter of less than 1000 nm, less than 500 nm, less than 100 nm, less than 50 nm, or less than 10 nm. According to some aspects, the conductive particles are ITO nanoparticles have an average particle diameter of about 1 nm to about 100 nm.

The combination of conducting particles and polymer binder used to make the resistive layers is desirably a material that: (a) is substantially transparent in the visible and/or NIR region of the electromagnetic spectrum; (b) bonds reasonably well to the conductive layers; (c) maintains its bonding when associated with a sealing member; (d) is generally resistant to corrosion from solvents and materials contained within the electrochromic material or atmosphere; and (e) exhibits minimal diffusion or specular reflectance, as well as sufficient electrical conductance.

To form the first and second resistive layers 22, 38, the conductive particles are mixed with a polymer binder. In some aspects, the polymer binder is polyvinyl alcohol. Polyvinyl alcohol is resistant to propylene carbonate and other fluids, solvents, and/or plasticizers used in the electrochromic layer 26. Other polymer binder materials that may be used according to the present disclosure include ethylene-vinyl alcohol (EVOH) copolymers, polyethylene (PE), polypropylene (PP), ethylene-propylene copolymers, cyclic olefin copolymers (COC), and cyclic olefin polymers (COP). The conductive particles, e.g. ITO particles or nanoparticles, provide enough conductivity to power the cell but the corresponding first and second resistive layers 22, 38 are more resistive than the underlying first and second conductive layers 18 and 34. Different ratios of conductive particles to polyvinyl alcohol were used to adjust the color and conductivity of the first and second resistive layers 22, 38. In some aspects, the weight ratio of conductive particles to polymer binder may range from about 1:2 to about 10:1. In some aspects, the weight ratio of conductive particles to polymer binder may be from about 1:2 to about 5:1, from about 1:1 to about 4:1, or about 1:2, about 1:1, about 2:1, about 3:1, about 4:1, about 5:1, about 6:1, about 7:1, about 8:1, about 9:1, or about 10:1 including all values in between the listed ranges.

The thicknesses of the first and second resistive layers 22, 38 may each independently range from about 1 μm to about 50 μm, from about 1 μm to about 25 μm, from about 1 μm to about 10 μm, from about 1 μm to about 75 μm, from about 1 μm to about 100 μm, from about 1 μm to about 100 μm, from about 1 μm to about 200 μm, from about 1 μm to about 250 μm, from about 1 μm to about 500 μm, or from about 1μm to about 5 μm. In some aspects, the thickness of the conductive particle polymer binder blend used to make the first and second resistive layers 22, 38 may be about 1 μm, about 5 μm, about 10 μm, about 15 μm, about 20 μm, about 25 μm, about 30 μm, about 35 μm, about 40 μm, about 45 μm, about 50 μm, about 75 μm, about 100 μm, about 200 μm, about 250 μm, or about 500 μm.

The electrochromic layer 26 may be any appropriate electrochromic material, such as a single-layer, single-phase electrochromic materials, multi-layer electrochromic materials, or multi-phase electrochromic materials. Illustrative electrochromic materials include those described in U.S. Pat. Nos. 4,902,108; 5,888,431; 5,940,201; 6,057,956; 6,268,950; 6,635,194; 9,939,701; and 8,928,966; U.S. Pat. No. 10,774,198, which are incorporated herein by reference in their entirety. Anodic and cathodic electrochromic materials may also include coupled materials as described in U.S. Pat. No. 6,249,369, which is incorporated herein by reference in its entirety. The concentration of the electrochromic materials may be selected as taught in U.S. Pat. No. 6,137,620, which is incorporated herein by reference in its entirety. The electrochromic material may exhibit a change in its extinction coefficient at one or more wavelengths upon exposure to a particular voltage, this behavior may be observed as a change in coloration or transmittance of the electrochromic material. In some aspects the electrochromic material may produce a change in the appearance of the electrochromic device in response to an applied voltage.

In some aspects, the electrochromic device 10 may include a sensing electrode (not shown). The sensing electrode may be configured to measure the voltage applied at the electrochromic material. A control circuit or device (not shown) may utilize the measured voltage to adjust the drive voltage supplied by the voltage source to maintain voltage applied to the electrochromic material in a desired range, such as about 1.2 V. The drive voltage necessary to produce the desired voltage at the electrochromic material may depend on environmental factors, such as temperature. For this reason, a sense electrode may be especially beneficial in applications where an electrochemical device may be subjected to a variety of environmental conditions.

The following examples describe various features and advantages provided by the disclosure, and are in no way intended to limit the invention and appended claims.

EXAMPLES

Example 1

Figure 2:
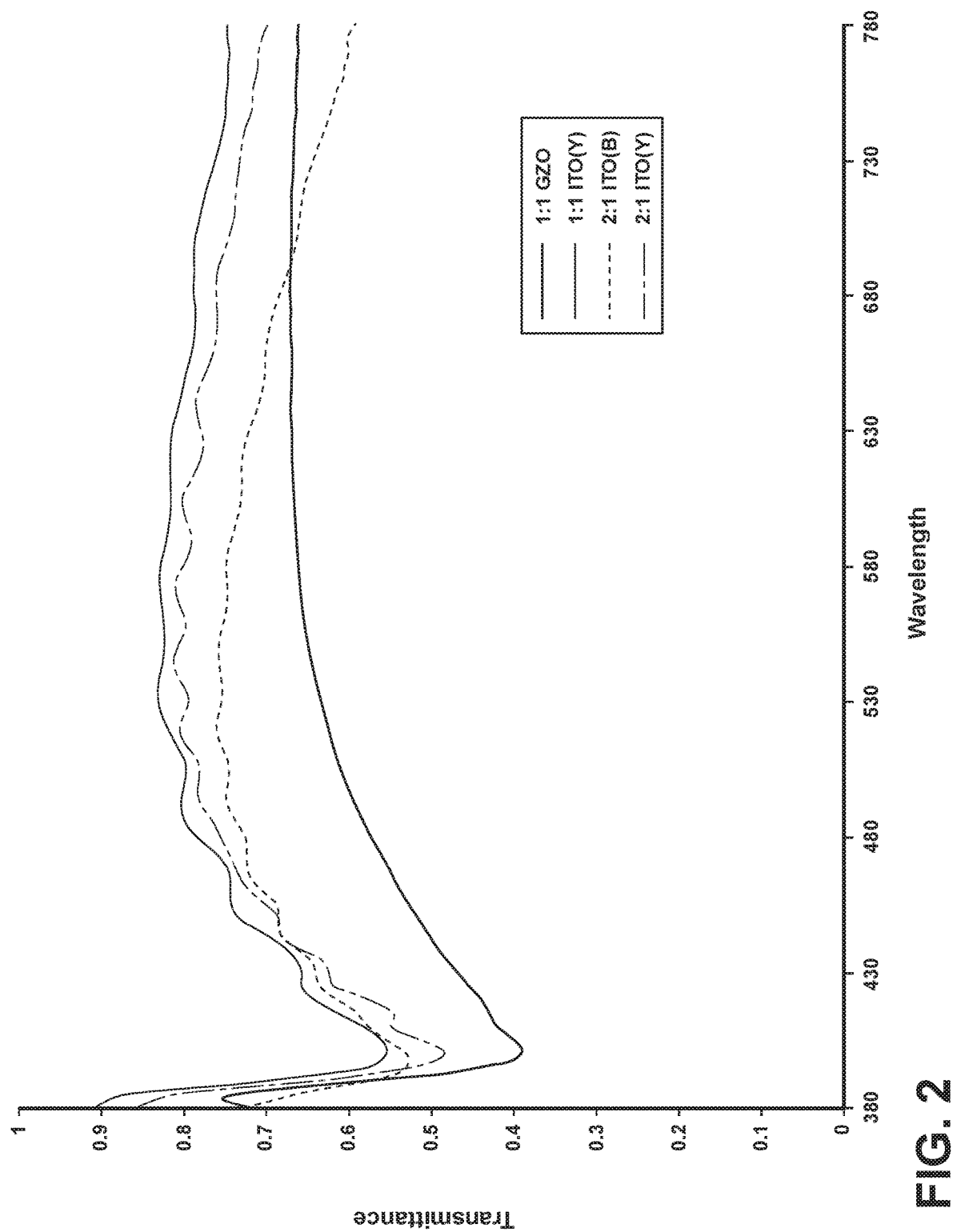
FIG. 2 is a graph of several clear state spectra of electrochromic devices having a variety of different conductive particle and polymer binder blend resistive layers, according to aspects of the present disclosure.

Referring now to FIG. 2, a transmission plot of several different exemplary conductive particle-polymer resistive films is provided for the respective electrochromic devices in the clear state (when no voltage is applied), according to an aspect of the present disclosure. The various ratios of conductive particle to polymer blend used for the Exemplary Samples according to the present disclosure include: 1:1 GZO, 2:1 ITO(B), 2:1 ITO(Y), and 1:1 ITO(Y). Transmittance is close to a respective minimum for each of the conductive particle/polymer binder blends at about 400 nm. Each of the electrochromic devices in the clear state using the various conductive particle/polymer binder blends listed above have their respective transmittance roughly level off at wavelengths greater than 500 nm although each trace has a slightly positive or negative slope.

Each Exemplary Sample was prepared by combining a solution of about 30 percent by weight (wt %) conductive particles in ethanol with a solution of 15 wt % polyvinyl alcohol in water ("conductive particle-PVA solution"). 5-10 micrometer draw down coatings were made with the conductive particle-PVA solution. The conductive particle loadings were formulated so that the weight ratio of the conductive particle to polymer was as indicated. For example, a 1:1 ratio of conductive particle:polymer corresponds to 2% conductive particle:2% polymer and a 2:1 ratio corresponds to 4% conductive particle:2% polymer. The conductive particle-PVA solutions were coated with a doctor bar onto a ½ wave ITO coated glass substrate to form conductive particle-PVA coated glass substrates.

The electrochromic devices were prepared using the prepared conductive particle-PVA coated glass substrates by cutting the substrates into 3×3 inch squares (~7.6×7.6 mm squares) and the edge of the conductive particle-polymer film was removed so that contact to the underlying ITO conductive layer could be made. The parts were then laid up with a thermoset epoxy seal containing monodispersed glass bead spacers with a diameter of 200 micrometers. These glass beads set spacing between the two substrates at about 200 micrometers. The devices were then vacuum back filled with an electrochromic fluid. The electrochromic fluid contained 38 mM of bis(octyl) viologen bis(tetrafluoroborate), 27 mM of N,N'-dihydro-N'N'-dimethyl phenazine, 0.5 mM of decamethyl ferrocenium tetrafluoroborate, 0.5 mM of decamethyl ferrocene, 2.2% by weight of a copolymer of 2-hydroxyethyl methacrylate and methyl acrylate (1:10 molar ratio), 0.15% Lupranate® MI (available from BASF), 2 parts-per-millions of dibutyltin diacetate, 15 mM of Tinuvin® 384 (available from BASF), and 50 mM of Lensorb™ C 279 (available from Monson Companies), all dissolved in propylene carbonate. The devices were then plugged with a UV-curable adhesive.

Example 2

Figure 3:
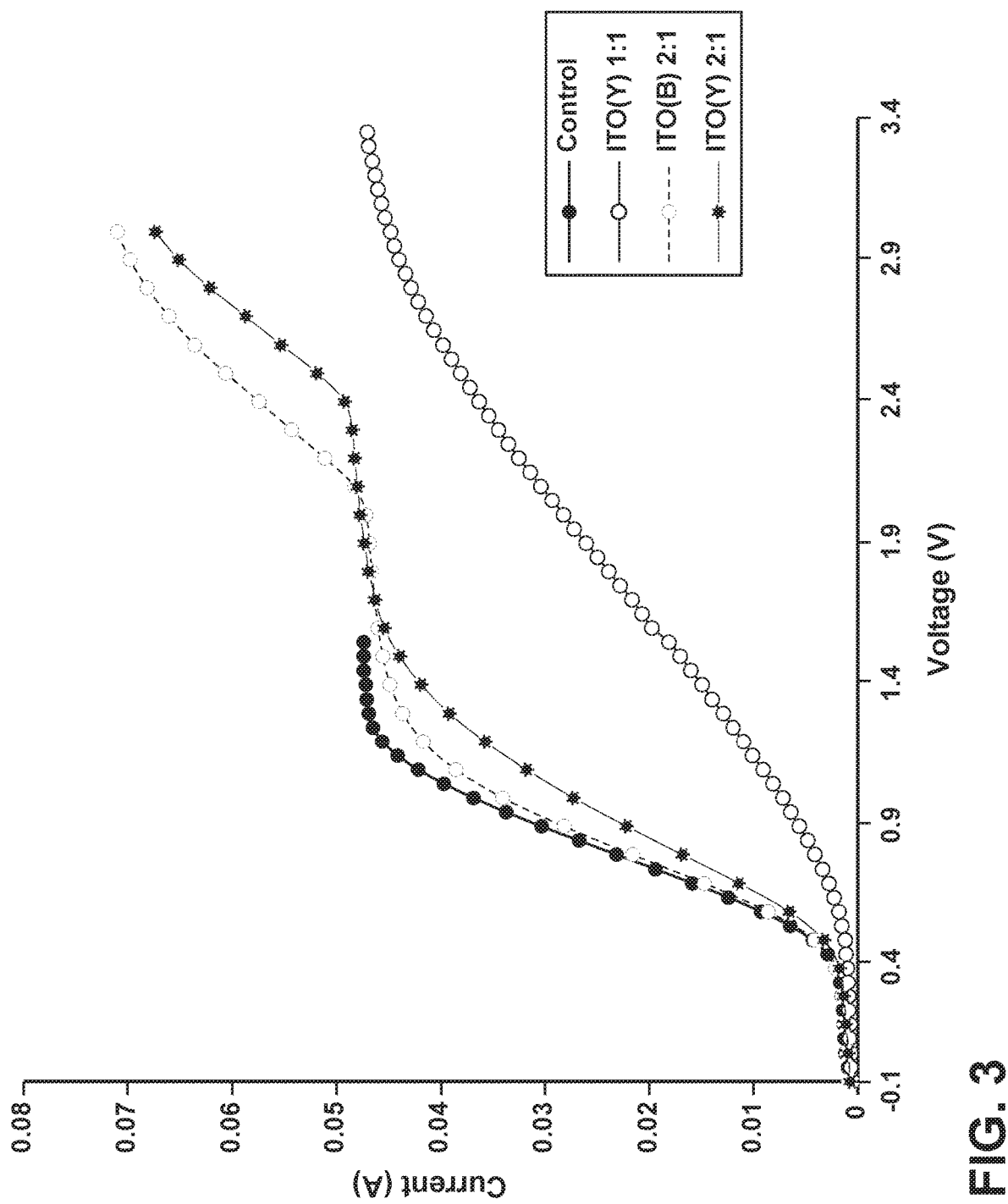
FIG. 3 is a plot of current as a function of voltage for exemplary samples, according to an aspect of the present disclosure.

FIG. 3 is an iE plot of current as a function of voltage for Exemplary Samples prepared as described above for Example 1 including the following conductive particle-polymer resistive film layers: 2:1 ITO(B), 2:1 ITO(Y), and 1:1 ITO(Y). Full and intermediate values for each device were selected for further testing. A control sample ("Control") was made in the same manner as the Exemplary Samples except the Control did not include the conductive particle-polymer resistive film layers. The full potential for each device was selected at the first plateau of the respective iE curve and the intermediate potential was selected about half way up the first wave to this first plateau. The intermediate and full potentials, respectively, were selected as follows: 0.8V and 1.2V for the Control; 0.85V and 1.7V for ITO(B) 2:1; 0.85V and 2.0V for ITO(Y) 2:1; and 1.8V and 3.4V for ITO(Y) 1:1.

Example 3

Figure 4:
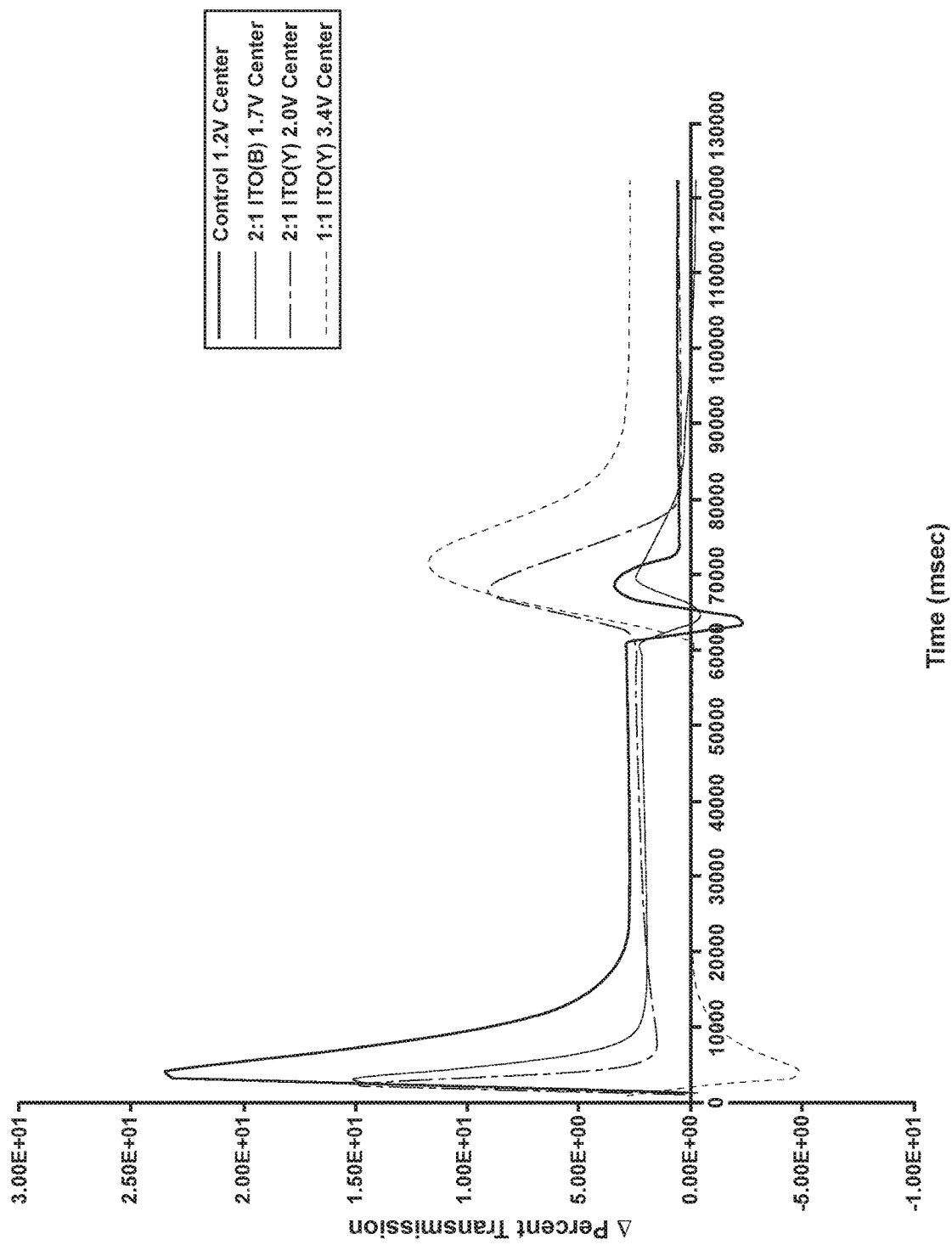
FIG. 4 is a graph of center-to-edge transmission difference spectra for exemplary samples, according to some aspects of the present disclosure.

Referring now to FIG. 4, a center-to-edge transmission plot conductive particle for the Exemplary Samples and Control of Example 2 at the full potential identified in Example 2 is shown. Exemplary Sample conductive particle2:1 ITO(B) was measured at 1.7V, Exemplary Sample 2:1 ITO(Y) was measured at 2.0V, Exemplary Sample 1:1 ITO(Y) was measured at 3.4V, and the Control was measured at 1.2V. At time zero the respective voltages are applied for each sample the center-to-edge transmission difference (Δ transmission) is measured. Irising is observed as an increase in the center-to-edge transmission difference. The Control sample at 1.2V demonstrated the greatest irising effect while the Exemplary Samples 2:1 ITO(B) at 1.7 V and 2:1 ITO(Y) at 2.0 V plots showed less irising. The resistive layer using the 1:1 ITO(Y) 3.4 V demonstrated a reverse irising effect where the center had a lower transmissivity than the edge portions. Turning off the applied voltage at the 60000 msec time showed a reverse irising effect where the edge portion became more transmissive relative to the center portion except for the Exemplary 2:1 ITO(Y) and 1:1 ITO(Y) samples.

Figure 5:
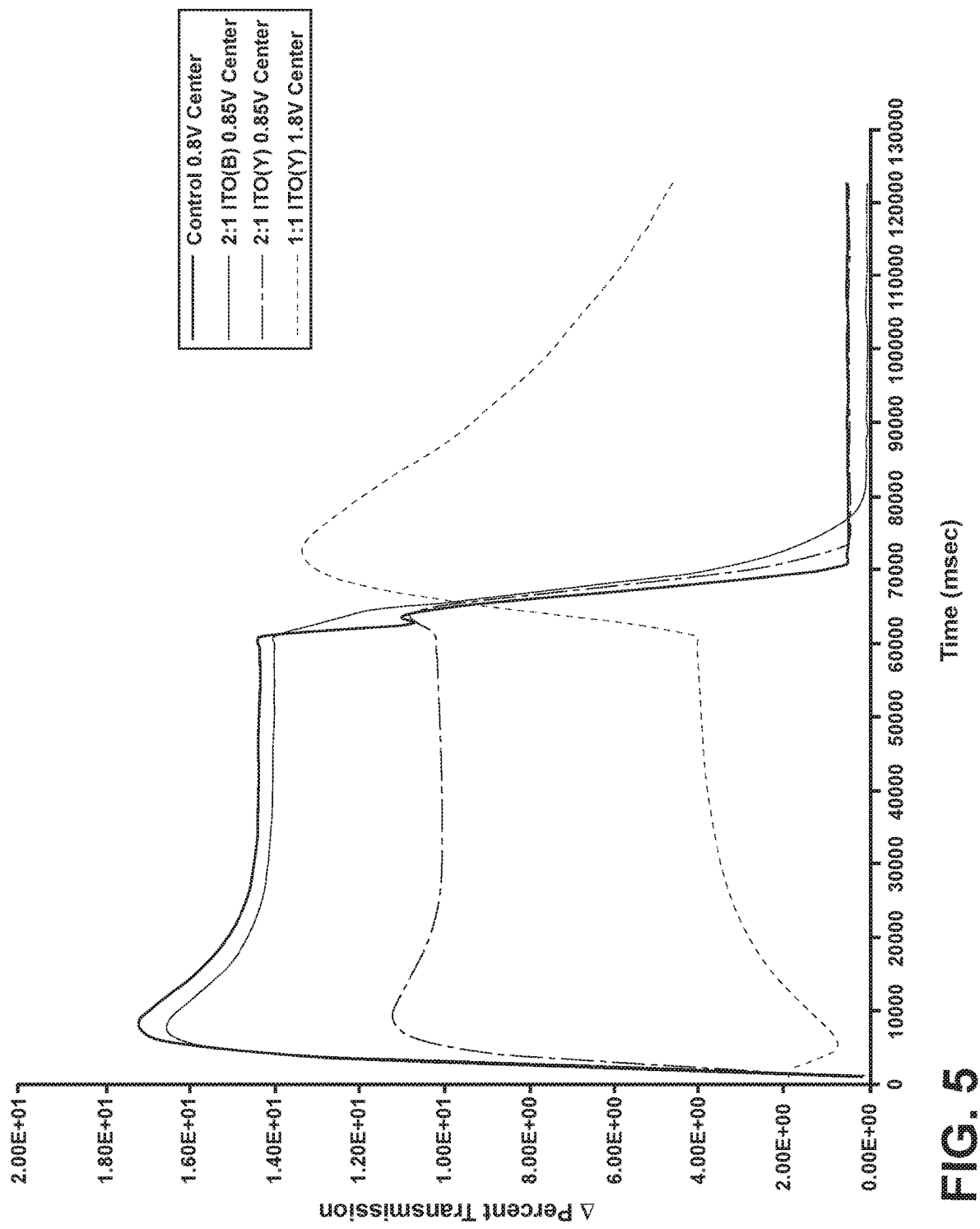
FIG. 5 is a graph of center-to-edge transmission difference spectra for exemplary samples, according to some aspects of the present disclosure.

Referring now to FIG. 5, a center-to-edge transmission plot for the Exemplary Samples and Control of Example 2 at the intermediate potential identified in Example is shown. Exemplary Sample 2:1 ITO(B) was measured at 0.85V, Exemplary Sample 2:1 ITO(Y) was measured at 0.85V, Exemplary Sample 1:1 ITO(Y) was measured at 1.8 V, and the Control was measured at 0.8 V. As illustrated in FIG. 5, the shape of the Δ transmission plots initially resemble the traces provided in FIG. 4 but then an at least partial irising effect is maintained after the application of the respective voltages.

Figure 6:
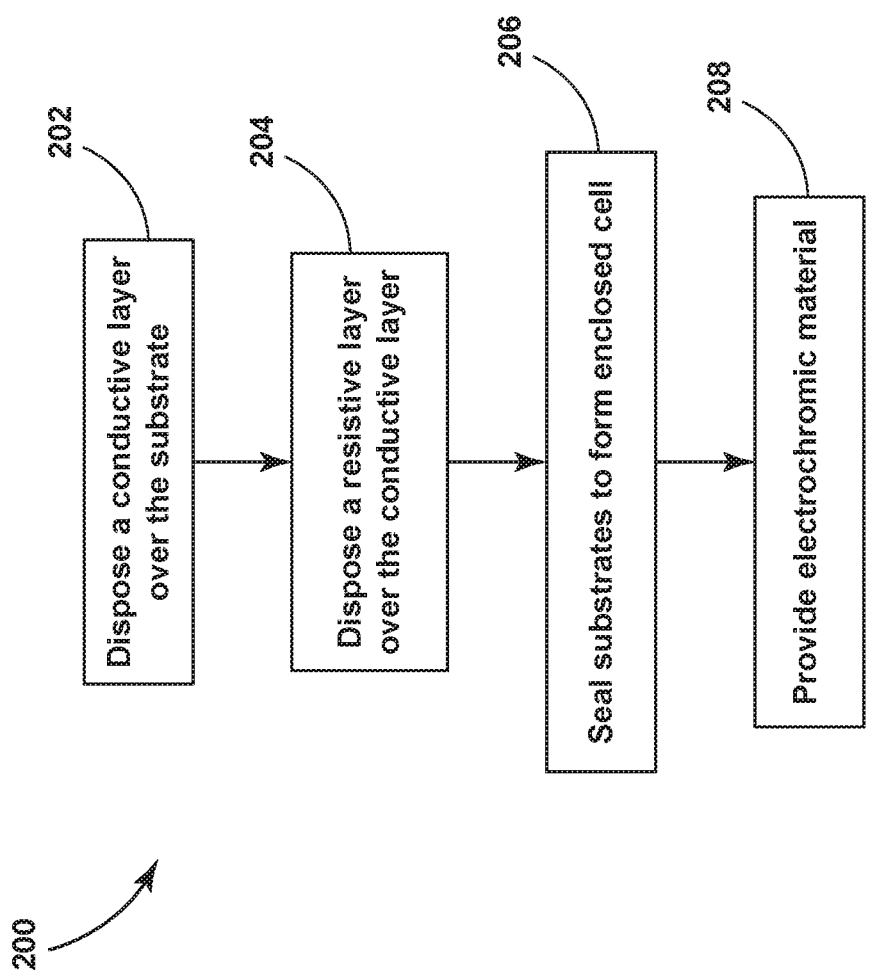
FIG. 6 is a flowchart of a method for making an electrochromic device, according to an aspect of the present disclosure.

Referring now to FIG. 6, a method 200 for producing the electrode 58, 62 for the electrochromic device 10 is provided. The method 200 includes: disposing the conductive layer 18, 34 over the substrate 14, 30 at 202 and disposing the resistive layer 22, 38 over the conductive layer 18, 34 at 204. The resistive layer 22, 38 includes conductive particles disposed in the polymer binder according to the present disclosure. The substrate 14, 30, conductive layer 18, 34, and resistive layer 22, 38 may each be substantially transparent.

The conductive layers 18, 34 may be formed by any appropriate deposition process, such as a chemical vapor deposition (CVD) process or a physical vapor deposition process (PVD). In some aspects the conductive layer 18, 34 may be formed by a sputtering deposition process. The resistive layers 22, 38 may then be disposed over the respective conductive layers 18, 34 by any appropriate deposition process. In some aspects the resistive layers 22, 38 may be formed using draw down methods, spray coating, slot die coating, or any other suitable deposition method.

The optional conductive layers or flash layers 50, 54 may then be disposed over the respective resistive layers 22, 38 by any appropriate deposition process. The optional conductive layers 50, 54 may be disposed utilizing the same deposition process as the conductive layers 18, 34.

Steps 202 and 204 of the method 200 can be used to form electrodes according to the present disclosure which include the conductive particle-polymer resistive film layer. The method 200 can continue with additional steps 206 and 208 to form an electrochromic device that incorporates the exemplary electrodes of the present disclosure. At 206, the electrodes 58 and 62 can be sealed together to form an enclosed chamber and at 208 an electrochromic material can be provided within the enclosed chamber.

The electrodes or electrode assemblies 58, 62 may be assembled to form the electrochromic device 10 according to steps 206 and 208 of the method 200. The electrodes 58, 62 may be assembled to form the chamber 46 that will be filled with the electrochromic layer 26. The electrochromic cell spacing may be determined by the distance between the electrodes 58, 62. The cell spacing may be in the range of about 10 μm to about 750 μm, such as about 20 μm to about 600 μm. In some aspects the cell spacing may be about 135 μm or about 200 μm. In some aspects spacers may be disposed between the electrodes 58, 62 to maintain the desired cell spacing, such as glass or polymer beads. The open edges of the electrochromic cell can be closed with seals 42. The seals 42 may also serve to bond the electrode assemblies 58, 62 together.

The chamber 46 is then filled with the electrochromic layer 26. The opening through which the electrochromic layer 26 is provided to the chamber 46 of the electrochromic device 10 may then be closed by a plug or seal 42. The closed chamber 46 prevents the electrochromic layer 26 from leaking out of the electrochromic device 10 and/or being exposed to the atmosphere.

The production of an electrochromic device 10 may also include the establishment of electrical connections to the electrodes 58, 62 from a voltage source and control circuitry. The electrical connections may be established through any appropriate means, such as wiring and solder connections of the type known in the art. The voltage source may be any appropriate voltage source, and may be a direct current voltage source. In some aspects, the voltage source may be any appropriate voltage source, and may be a direct current voltage source operating at less than or up to about 12 V. The control circuitry may be capable of altering the voltage supplied to the electrochromic device 10, such as a computer control circuit.

While the electrochromic material is illustrated in FIG. 1 as an electrochromic layer 26, it is understood that the electrochromic material can have other configurations without deviating from the scope of the present disclosure. For example, the electrochromic material can be in the form of anodic and cathodic gels, films, and/or solutions, and combinations thereof to provide the device with a change in coloration or transmittance when a voltage is applied.

It is understood that the descriptions outlining and teaching the electrochromic device 10 previously discussed, which can be used in any combination, apply equally well to the method for producing the electrode for the electrochromic device 10. The principles described above with regard to the electrochromic device 10 that includes resistive layers 22, 38 may be applied to any electrochromic device. For example, the electrochromic device 10 may be a window, mirror, or display.

The following non-limiting aspects are encompassed by the present disclosure:

According to a first aspect of the present disclosure, an electrochromic device includes a first substrate, a first conductive layer disposed over the first substrate a second substrate, and a second conductive layer disposed over the second substrate. An electrochromic material can be disposed between the first and second conductive layers. At least one resistive layer is disposed over at least one of the first conductive layer and the second conductive layer. The at least one resistive layer includes conductive particles disposed in a polymer binder, wherein the conductive particles include at least one doped metal oxide.

According to the first aspect, the electrochromic device is a window or a mirror.

According to the first aspect or any intervening aspects, the at least one resistive layer includes a first resistive layer disposed over the first conductive layer and a second resistive layer disposed over the second conductive layer.

According to the first aspect or any intervening aspects, the electrochromic device further includes a third conductive layer disposed on the first resistive layer and a fourth conductive layer disposed on the second resistive layer.

According to the first aspect or any intervening aspects, the first and/or second conductive layer includes indium tin oxide (ITO), fluorine doped tin oxide (FTO), doped zinc oxide, indium zinc oxide, a metal oxide/metal/metal oxide material, a metal carbide/metal/metal carbide material, a metal nitride/metal/metal nitride material, or a metal sulfide/metal/metal sulfide material.

According to the first aspect or any intervening aspects, the at least one doped metal oxide comprises a transparent doped metal oxide.

According to the first aspect or any intervening aspects, the at least one doped metal oxide includes tin-doped indium oxide (ITO), aluminum-doped zinc oxide (AZO), zinc-doped indium oxide (IZO), gallium-doped zinc oxide (GZO), fluorine-doped tin oxide (FTO), antimony-doped tin oxide (ATO), phosphorus-doped tin oxide (PTO), and niobium-doped titanium oxide (NTO).

According to the first aspect or any intervening aspects, the polymer binder includes at least one of polyvinyl alcohol, ethylene-vinyl alcohol copolymers, polyethylene, polypropylene, ethylene-propylene copolymers, cyclic olefin copolymers, and cyclic olefin polymers.

According to the first aspect or any intervening aspects, the at least one resistive layer has a sheet resistance of about 1,000 Ω/square to about 10,000 Ω/square.

According to the first or any intervening aspects, a ratio of conductive particles to polymer binder is in the range of about 1:2 to about 10:1.

According to the first or any intervening aspects, the at least one resistive layer includes a thickness of from about 1 micrometer to about 500 micrometers.

According to a second aspect of the present disclosure, an electrode assembly for an electrochromic device includes a substrate, a conductive layer disposed over the substrate, and a resistive layer disposed over the conductive layer. The resistive layer includes conductive particles disposed in a polymer binder, wherein the conductive particles include at least one doped metal oxide.

According to the second aspect of the present disclosure, the conductive layer includes indium tin oxide (ITO), fluorine doped tin oxide (FTO), doped zinc oxide, indium zinc oxide, a metal oxide/metal/metal oxide material, a metal carbide/metal/metal carbide material, a metal nitride/metal/metal nitride material, or a metal sulfide/metal/metal sulfide material.

According to the second aspect or any intervening aspects, the at least one doped metal oxide comprises a transparent doped metal oxide.

According to the second aspect of the present disclosure or any intervening aspects, the at least one doped metal oxide comprises tin-doped indium oxide (ITO), aluminum-doped zinc oxide (AZO), zinc-doped indium oxide (IZO), gallium-doped zinc oxide (GZO), fluorine-doped tin oxide (FTO), antimony-doped tin oxide (ATO), phosphorus-doped tin oxide (PTO), and niobium-doped titanium oxide (NTO).

According to the second aspect or any intervening aspects, the polymer binder includes at least one polyvinyl alcohol, ethylene-vinyl alcohol copolymers, polyethylene, polypropylene, ethylene-propylene copolymers, cyclic olefin copolymers, and cyclic olefin polymers.

According to the second aspect or any intervening aspects, the resistive layer has a sheet resistance of about 1,000 Ω/square to about 10,000 Ω/square.

According to the second aspect or any intervening aspects, the resistive layer includes a thickness of from about 1 micrometer to about 500 micrometers.

According to the second aspect or any intervening aspects, each of the substrate, the conductive layer, and the resistive layer is substantially transparent.

According to a third aspect of the present disclosure, a method of forming an electrode assembly for an electrochromic device is provided. The method includes disposing a conductive layer over a substrate and disposing a resistive layer over the conductive layer. The resistive layer includes conductive particles disposed in a polymer binder, wherein the conductive particles include at least one doped metal oxide.

According to the third aspect, each of the substrate, the conductive layer, and the resistive layer is substantially transparent.

According to the third aspect or any intervening aspects, the at least one doped metal oxide comprises a transparent doped metal oxide.

According to the third aspect or any intervening aspect, the at least one doped metal oxide includes tin-doped indium oxide (ITO), aluminum-doped zinc oxide (AZO), zinc-doped indium oxide (IZO), gallium-doped zinc oxide (GZO), fluorine-doped tin oxide (FTO), antimony-doped tin oxide (ATO), phosphorus-doped tin oxide (PTO), and niobium-doped titanium oxide (NTO).

According to the third aspect or any intervening aspect, the method further includes disposing a second conductive layer over the resistive layer.

According to the third aspect or any intervening aspect, the resistive layer has a sheet resistance of about 1,000 Ω/square to about 10,000 Ω/square.

According to the third aspect or any intervening aspect, the polymer binder includes at least one of polyvinyl alcohol, ethylene-vinyl alcohol copolymers, polyethylene, polypropylene, ethylene-propylene copolymers, cyclic olefin copolymers, and cyclic olefin polymers.

According to the third aspect or any intervening aspect, the resistive layer includes a thickness of from about 1 micrometer to about 500 micrometers.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated aspects only. Modifications of the device will occur to those skilled in the art and to those who make or use the device. Therefore, it is understood that the aspects shown in the drawings and described above is merely for illustrative purposes and not intended to limit the scope of the device, which is defined by the following claims as interpreted according to the principles of patent law, including the Doctrine of Equivalents.

What is claimed is:

1. An electrochromic device, comprising:
a first substrate;
a first conductive layer disposed over the first substrate;
a second substrate;

a second conductive layer disposed over the second substrate;

an electrochromic material disposed between the first and second conductive layers; and at least one resistive layer disposed over at least one of the first conductive layer and the second conductive layer, wherein the at least one resistive layer includes conductive particles disposed in a polymer binder, and wherein the conductive particles comprise at least one doped metal oxide.

2. The electrochromic device of claim 1, wherein the at least one resistive layer comprises a first resistive layer disposed over the first conductive layer and a second resistive layer disposed over the second conductive layer.

3. The electrochromic device of claim 2, further comprising:

a third conductive layer disposed over the first resistive layer; and a fourth conductive layer disposed over the second resistive layer.

4. The electrochromic device of claim 1, wherein the at least one doped metal oxide comprises tin-doped indium oxide (ITO), aluminum-doped zinc oxide (AZO), zinc-doped indium oxide (IZO), gallium-doped zinc oxide (GZO), fluorine-doped tin oxide (FTO), antimony-doped tin oxide (ATO), phosphorus-doped tin oxide (PTO), and niobium-doped titanium oxide (NTO).

5. The electrochromic device of claim 1, wherein the polymer binder comprises at least one of polyvinyl alcohol, ethylene-vinyl alcohol copolymers, polyethylene, polypropylene, ethylene-propylene copolymers, cyclic olefin copolymers, and cyclic olefin polymers.

6. The electrochromic device of claim 1, wherein the at least one resistive layer has a sheet resistance of about 1,000 Ω/square to about 10,000 Ω/square.

7. The electrochromic device of claim 1, wherein a ratio of conductive particles to polymer binder is from about 1:2 to about 10:1.

8. The electrochromic device of claim 1, wherein the at least one resistive layer comprises a thickness of from about 1 micrometer to about 500 micrometers.

9. An electrode assembly for an electrochromic device, comprising:

a substrate;

a conductive layer disposed over the substrate; and a resistive layer disposed over the conductive layer, wherein the resistive layer includes conductive particles disposed in a polymer binder, and wherein the conductive particles comprise at least one doped metal oxide.

10. The electrode assembly of claim 9, wherein the at least one doped metal oxide comprises tin-doped indium oxide (ITO), aluminum-doped zinc oxide (AZO), zinc-doped indium oxide (IZO), gallium-doped zinc oxide (GZO), fluorine-doped tin oxide (FTO), antimony-doped tin oxide (ATO), phosphorus-doped tin oxide (PTO), and niobium-doped titanium oxide (NTO).

11. The electrode assembly of claim 9, wherein the polymer binder comprises at least one of polyvinyl alcohol, ethylene-vinyl alcohol copolymers, polyethylene, polypropylene, ethylene-propylene copolymers, cyclic olefin copolymers, and cyclic olefin polymers.

12. The electrode assembly of claim 9, wherein the resistive layer has a sheet resistance of about 1,000 Ω/square to about 10,000 Ω/square.

13. The electrode assembly of claim 9, wherein the resistive layer comprises a thickness of from about 1 micrometer to about 500 micrometers.

14. The electrode assembly of claim 9, wherein each of the substrate, the conductive layer, and the resistive layer is substantially transparent.

15. A method of forming an electrode assembly for an electrochromic device, the method comprising:

disposing a conductive layer over a substrate; and disposing a resistive layer over the conductive layer, wherein the resistive layer includes conductive particles disposed in a polymer binder, and wherein the conductive particles comprise at least one doped metal oxide.

16. The method of claim 15, wherein each of the substrate, the conductive layer, and the resistive layer is substantially transparent.

17. The method of claim 15, wherein the at least one doped metal oxide comprises tin-doped indium oxide (ITO), aluminum-doped zinc oxide (AZO), zinc-doped indium oxide (IZO), gallium-doped zinc oxide (GZO), fluorine-doped tin oxide (FTO), antimony-doped tin oxide (ATO), phosphorus-doped tin oxide (PTO), and niobium-doped titanium oxide (NTO).

18. The method of claim 15, wherein the resistive layer has a sheet resistance of about 1,000 Ω/square to about 10,000 Ω/square.

19. The method of claim 15, wherein the polymer binder comprises at least one of polyvinyl alcohol, ethylene-vinyl alcohol copolymers, polyethylene, polypropylene, ethylene-propylene copolymers, cyclic olefin copolymers, and cyclic olefin polymers.

20. The method of claim 15, wherein the resistive layer comprises a thickness of from about 1 micrometer to about 500 micrometers.

* * * * *